June 12, 1928.  1,673,251

W. A. KOSKEN

ART OF MOTION PICTURES

Original Filed Oct. 20, 1923    7 Sheets-Sheet 1

INVENTOR.
Wilho A. Kosken
Jas. H. Griffin
ATTORNEYS.

June 12, 1928.

W. A. KOSKEN

ART OF MOTION PICTURES

Original Filed Oct. 20, 1923   7 Sheets-Sheet 4

1,673,251

June 12, 1928.
W. A. KOSKEN
1,673,251
ART OF MOTION PICTURES
Original Filed Oct. 20, 1923   7 Sheets-Sheet 5
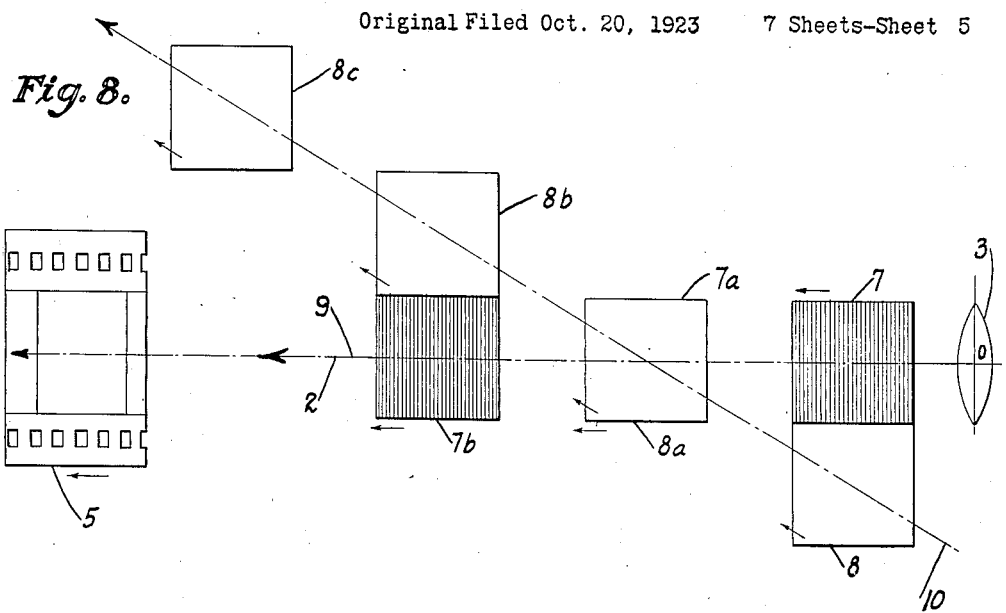
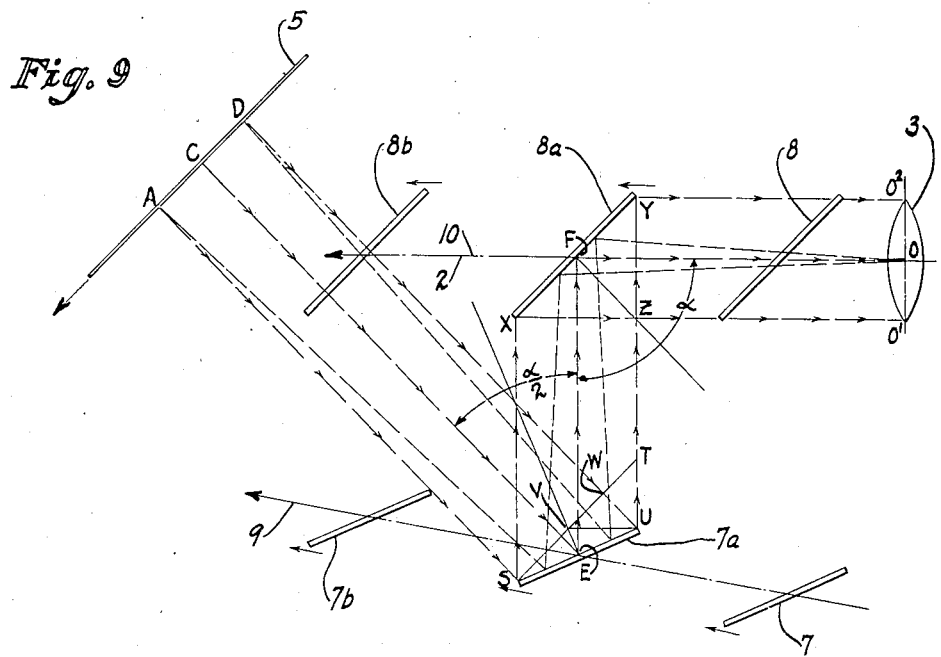
INVENTOR.
Wilho A. Kosken
BY Jas. H. Griffin
ATTORNEYS.

June 12, 1928.
W. A. KOSKEN
ART OF MOTION PICTURES
Original Filed Oct. 20, 1923     7 Sheets-Sheet 6
1,673,251
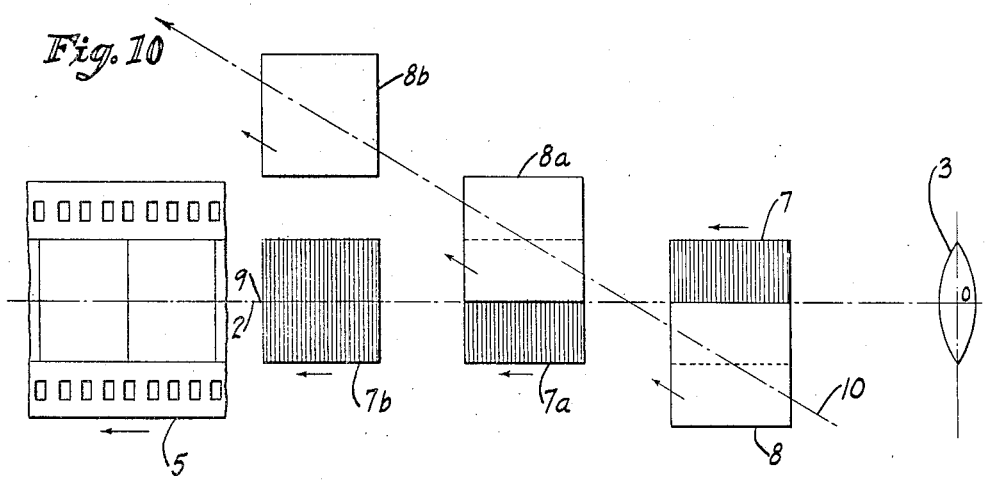
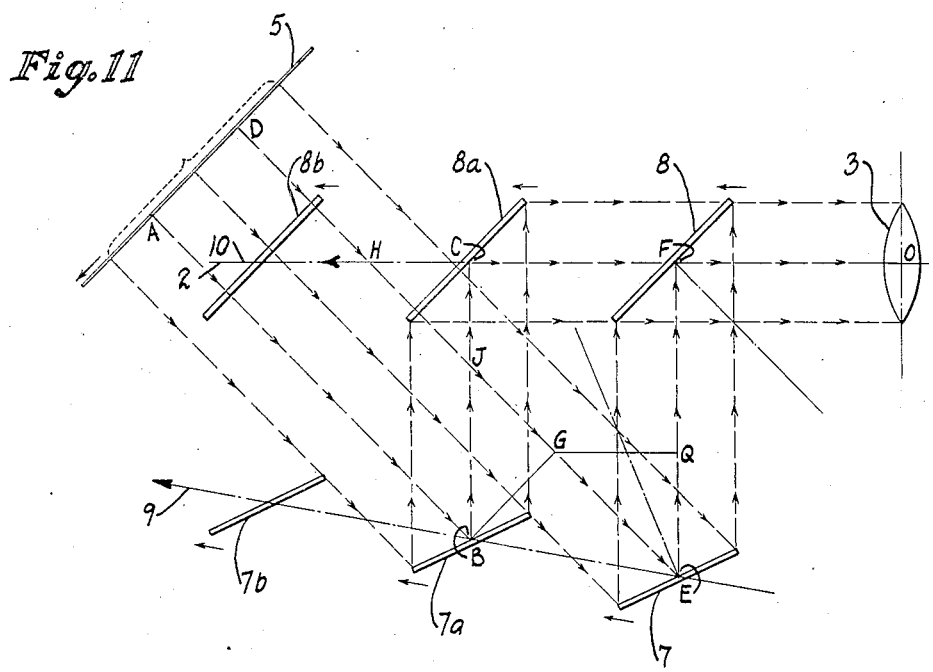
INVENTOR.
Wilho A. Kosken
BY Jas. H. Griffin
ATTORNEYS.

June 12, 1928.

W. A. KOSKEN 1,673,251

ART OF MOTION PICTURES

Original Filed Oct. 20, 1923      7 Sheets-Sheet 7

INVENTOR
Wilho A. Kosken
BY
Jas. H. Griffin
ATTORNEY

Patented June 12, 1928

1,673,251

UNITED STATES PATENT OFFICE.

WILHO A. KOSKEN, OF RICHMOND HILL, NEW YORK, ASSIGNOR TO STEADYLITE MOTION PICTURE MACHINE CORPORATION, OF NEW YORK, N. Y., A CORPORATION OF NEW YORK.

ART OF MOTION PICTURES.

Application filed October 20, 1923, Serial No. 669,673. Renewed November 25, 1927.

This invention relates to the art of motion pictures and is particularly directed to a novel process of producing motion pictures, and apparatus for carrying out the process. The invention is directed generally to apparatus of the character which operates in conjunction with a continuously moving film or web in contradistinction to the conventional motion picture machines wherein the film is intermittently operated with intervening periods of rest or dwell during which the picture is exhibited through a shuttered aperture. Machines constructed in accordance with the present invention require no shutter and inasmuch as the film moves constantly I not only obtain maximum light intensity for the projection of the picture but also eliminate strains on the film which result when the film is rapidly accelerated after stopping. Moreover, the absence of a shutter enables me to eliminate flicker and the resulting eyestrain which results from prolonged looking at a picture wherein such flicker is present.

The object of the invention is to produce an apparatus for the taking or projection of motion pictures through the employment of a constantly moving film and without necessitating the employment of a shutter and to obtain these results by apparatus which will not require such nice or exact adjustments as have been required in prior apparatus of this general character. In other words, it is the object of this invention to provide an apparatus of this general character which can be readily and expeditiously manufactured and operated without the necessity of perfect precision and to thereby obtain such an apparatus which may be constructed and operated at minimum costs.

In my copending application, Serial No. 606,634, I have described and claimed apparatus to be employed in conjunction with a constantly moving film and without necessitating the employment of a shutter. In said apparatus, two series of synchronized moving mirrors or deflectors are employed to deflect or bend a transmitted beam of light in such manner as to produce a moving picture effect, but in said apparatus the paths of the moving deflectors are so disposed that considerable accuracy is required for the proper operation of the machine.

In the machine of the present invention, the parts are so disposed with respect to one another that this high degree of accuracy previously required is not necessary. This simplification is the result of the novel and unique process of projection underlying the present invention and the apparatus constructed to carry out this process will fulfill all the requirements of practical operation and at the same time is more economical to manufacture and is not apt to get out of order.

Speaking generally, the process hereinunder consideration consists in projecting a beam of light through a standard motion picture film, while the film is caused to move constantly and directing the projected beam beyond the film upon a series of deflectors which travel along a path, the medial line of which is coincident with a plane passing through the axis of a lens through which the beam is to be projected and directing the deflected beam through the lens by means of a second series of deflectors which travel in a direction oblique to the plane including the medial line of the film, the source of light, the axis of the first series of deflectors and the lens.

From a constructional standpoint, the invention consists in including in a common plane a source of light, the medial line of the film, the axis of one series of deflectors and the axis of the objective and mounting the second series of deflectors to move through and intersect said plane in a direction having an angular relation to said plane.

The invention embodies many novel features of advantage which will be apparent from the following detailed description and appended claims when read in conjunction with the accompanying drawings.

In the accompanying drawings, I have illustrated one form of apparatus which may be employed for the carrying out of the process of this invention, but I wish it understood that the process may be carried out through other appropriate apparatus, so that the form of the invention shown in the drawings is to be understood for the purpose of illustration only and not as defining the merits of the invention.

Figure 8 is a diagrammatic plan view showing the relationship between the lens, film and upper and lower series of deflectors at a time when the transmitted light beam is reflected from one of the lower series of deflectors on to one of the upper series of deflectors and thence to the lens.

Figure 9 is a diagrammatic elevation illustrating the path of the beam when the parts are in the relation shown in Figure 8.

Figure 10 is a diagrammatic plan view showing the relationship between the lens, film, and upper and lower series of deflectors at a time when the transmitted light beam is reflected from two overlapping deflectors of the lower series on to and by two overlapping deflectors of the upper series.

Figure 11 is a diagramamtic illustration of the source of the beam when the conditions specified with relation to Figure 8 exist; and, Figure 12 is a perspective view illustrating in a graphic manner the relative position of the parts and showing the relative placement between these parts and the direction of movement of the moving parts.

Figure 12:
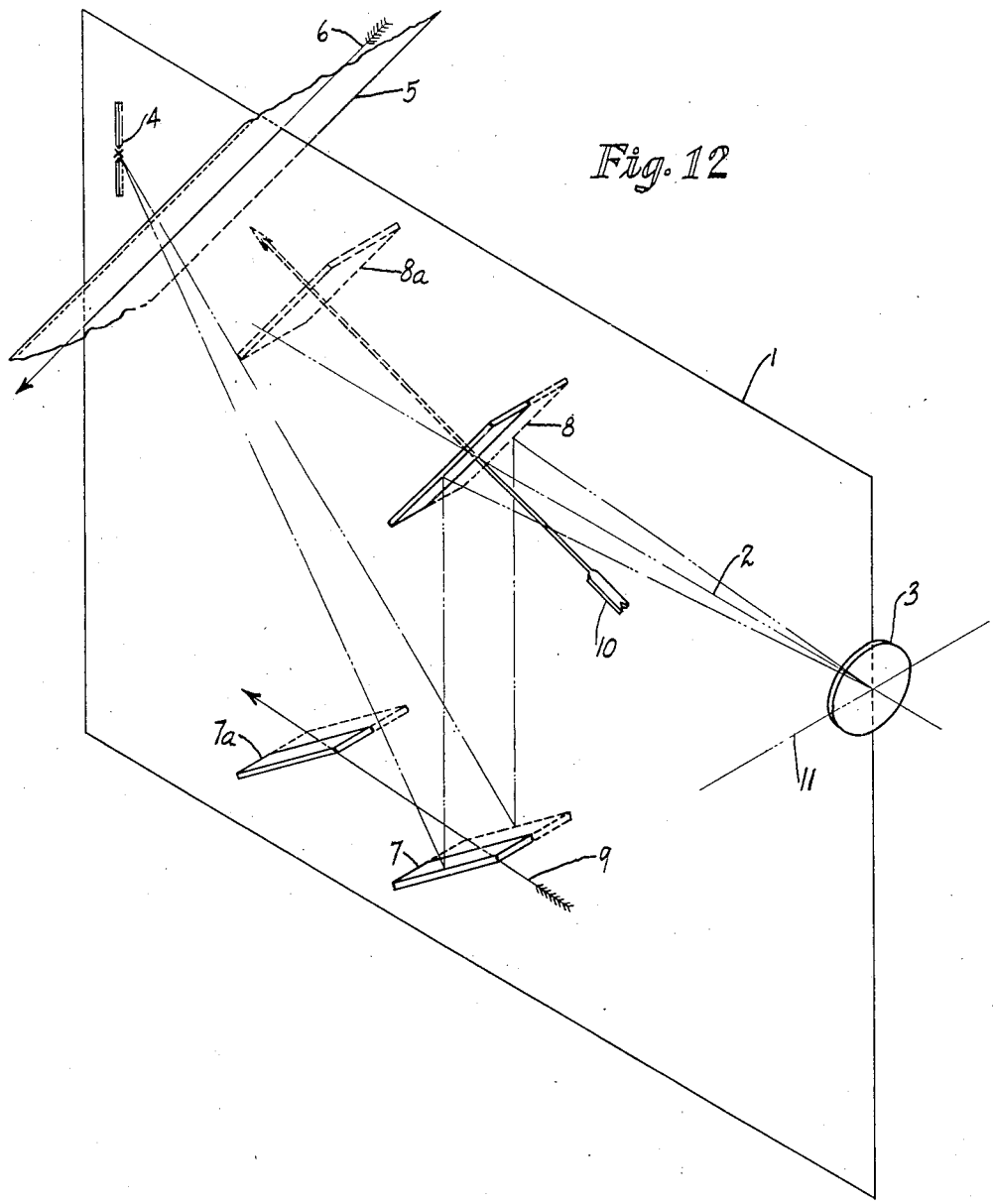

In order that the principle underlying this invention may be clearly understood, I will first describe the general principles with reference more especially to Figure 12. In this showing, I have illustrated, in the interest of clearness, a plane 1 containing the axis 2 of a lens 3, which lens represents any suitable lens or combination of lenses for the taking or projection of a motion picture. Also positioned in the plane 1 is a source of light 4 of any suitable character shown for the purpose of illustration as an electric arc. Passing before the source of light 4 is a moving web or film 5 adapted to move constantly in contradistinction to the usual periods of rest or dwell. This film or web may travel in either direction, but in this showing it travels in the direction of the arrow 6 and the web is so guided that its medial line will be contained in the plane 1. In practice, when the machine is used as a projector, the web 5 may constitute a standard motion picture film.

7 and 7$^a$ designate two of a series of what may be termed lower or primary deflectors, since it is on these deflectors that a beam of light from the source of power 4 first impinges, before being reflected by these primary deflectors upon one or more of a series of upper or secondary deflectors, two of which 8 and 8$^a$ are illustrated in Figure 12. The lower deflectors 7 and 7$^a$ are two of a series so disposed and mounted that as they approach and recede from the path of the transmitted beam from the source of light, they will travel along an axis or path shown by the arrow 9 which lies within the plane 1. Moving along the path 9, the primary deflectors successively approach and recede from the path of the transmitted beam from the source of light 4 and when they reach the path of this beam, they either collectively or individually reflect the beam upwardly upon the deflectors of the secondary series which in turn either separately or collectively reflect the beam through the lens 3. The path or axis of the deflectors of the secondary series is designated by the arrow 10 which passes through the centers of those deflectors of the secondary series which are directly approaching or receding the path of the reflected beam from the deflectors of the primary series. In Figure 12, the arrow 10, which is illustrated in perspective, clearly shows that said arrow is not coincident with the plane 1, but in contradistinction, passes through said plane in oblique relation thereto. In practice, however, if the plane 1 is a substantially vertical plane, the arrow 10 may lie in the plane 11 which is horizontal or substantially so and this horizontal plane may contain the lens axis 2. In other words in the embodiment specified, the lens axis will come at the intersection of the planes 1 and 11.

It will be apparent from what has been said that in the plane 1 is positioned the source of light 4, the axis of the lens 3, the medial line of the film 5 and the axis of the primary deflectors 7, 7$^a$, etc., while the axis of the secondary deflectors extends obliquely of a horizontal plane normal to the plane 1. In practice, however, the plane 11 need not necessarily be horizontal nor need it contain the lens axis 2. The construction shown however is preferable. The manner in which light is passed from the source of light 4 through the lens 3 by way of the several deflectors is more clearly shown in Figures 8 to 11 inclusive.

It is to be noted that the deflectors travel at a continuous speed in contradistinction to an intermittent movement and this fact makes their operation smooth and free from vibration.

As shown in Figures 8 and 9, the deflectors $7^a$ and $8^a$ are moved along their respective paths 9 and 11 until the center of the deflector $8^a$ is in the plane 1 and the deflector $7^a$ is in the path of the transmitted beam. In Figure 9, E designates the center of the deflector $7^a$ and F the center of the deflector $8^a$. At this instant, the broken line CEFO (center of the lens) represents a light ray between the medial line of the film, the centers of the deflectors $7^a$ and $8^a$ and the center of the lens and this broken line will obviously be coincident with and contained in the plane 1. Furthermore, in practice, each of the deflectors 8, $8^a$, $8^b$, $8^c$, etc. are positioned so that they will approach and recede from reflecting position in planes which are parallel to the plane of the film 5. If we bisect the angle EFO by a line FZ, this line will manifestly be parallel to the line CE since both of these lines are perpendicular to parallel lines. It therefore follows that the angle CEF will be equal to the angle EFZ as alternate interior angles. If we term the angle EFO as alpha it follows that the angle CEF will equal one half alpha. In other words, it will be apparent that the angle of incidence which the beam of light makes with the deflector $7^a$ will be one half the angle of incidence which said beam makes with the deflector $8^a$.

The deflectors 7, $7^a$ and $7^b$ also approach and recede from the reflecting position in planes parallel to one another and it therefore follows that the angle of incidence which the beam makes with any of the reflectors 7, $7^a$, $7^b$, etc., will be one half the angle of incidence which the reflected beam makes with the deflectors 8, $8^a$, $8^b$, etc., and, accordingly, these deflectors or mirrors will at all times throughout their zones of approach or recedence be maintained in constant angular relation to one another.

In order that picture projection may be uniform, it is essential that the paths of the light rays passing between the film and the lens be of equal length and it can be readily proven that the broken line $DUYO^2$ is equal in length to the broken line ASXO'. If a line ST is drawn through S parallel to the film 5 and in the plane 1, AD being parallel to XY, two parallelograms will be formed, namely, the one having the sides AS, SW, WD and DA and the other having the sides XS, ST, TY and YX. A third parallelogram is present, namely, that having the sides $YO^2$, $O^2O'$, $O'Z$ and $ZY$. Accordingly:—

AS equals DW
ZO' " $YO^2$
SX " TY
UT " UV—Two sides of equilateral triangle.
XY " ST
WU " WT—Two sides of equilateral triangle.
SV " VU— "     "     "     "     "
SW " SV + VW
XZ " SW Therefore XZ equals WU + UT.

Accordingly AS + SX + XO' equals DU + UY + $YO^2$.

This being the case the projected picture will not be distorted and may be properly focused at any particular instant.

In accordance with this invention moreover, movement of the respective deflectors into and out of reflecting position will not cause any variation of the lengths of light rays as can be clearly proven more especially from Figure 11 wherein the rays are shown as being bent by two cooperating deflectors of each series.

This may be proven by showing that:— (See Figs. 9 and 11).

$$AB + BC + CO \text{ equals } DE + EF + FO.$$

Proof:—

AB equals DG as BG equals pitch and is parallel to AD.
FO is common and EF is given.
$BJ = \sqrt{2}BG$
QG is parallel to the lens axis CO.
QG=BG (pitch)
$GE = \sqrt{2}QG$
GJ=BG (two sides of equilateral triangle).
$EH = \sqrt{2}EF$.
JH=EH−GE−GJ.
$JC = \dfrac{JH}{\sqrt{2}}$
BC=BJ+JC
CF=GE+EF−BC.

It therefore follows that the broken line ABCO is equal in length to the broken line DEFO and accordingly the lengths of the rays between the film and the lens will not vary irrespective of the movements of the deflectors.

As a result of this condition, the pictures either taken or projected upon a screen may be properly focused and will remain focused. Moreover, distortion which might result from variation in light ray lengths is precluded. In practice, the deflectors of both the primary and secondary series approach and recede from their operative positions with respect to one another in synchronized relation so that as the deflectors of both series recede while bending the transmitted beam, the next two cooperating deflectors come into proper position to take up the work as the others leave off and there results a continuous bending of the beam without change of ray length. Accordingly, shutters and other mechanical expedients heretofore used are not required and pictures without flicker and having a continuity of visibility are produced.

Different forms of apparatus may be employed for carrying out the method which has been explained, and in Figures 1 to 7 of the drawings I have shown one practical form of apparatus which will now be described.

Figure 1:
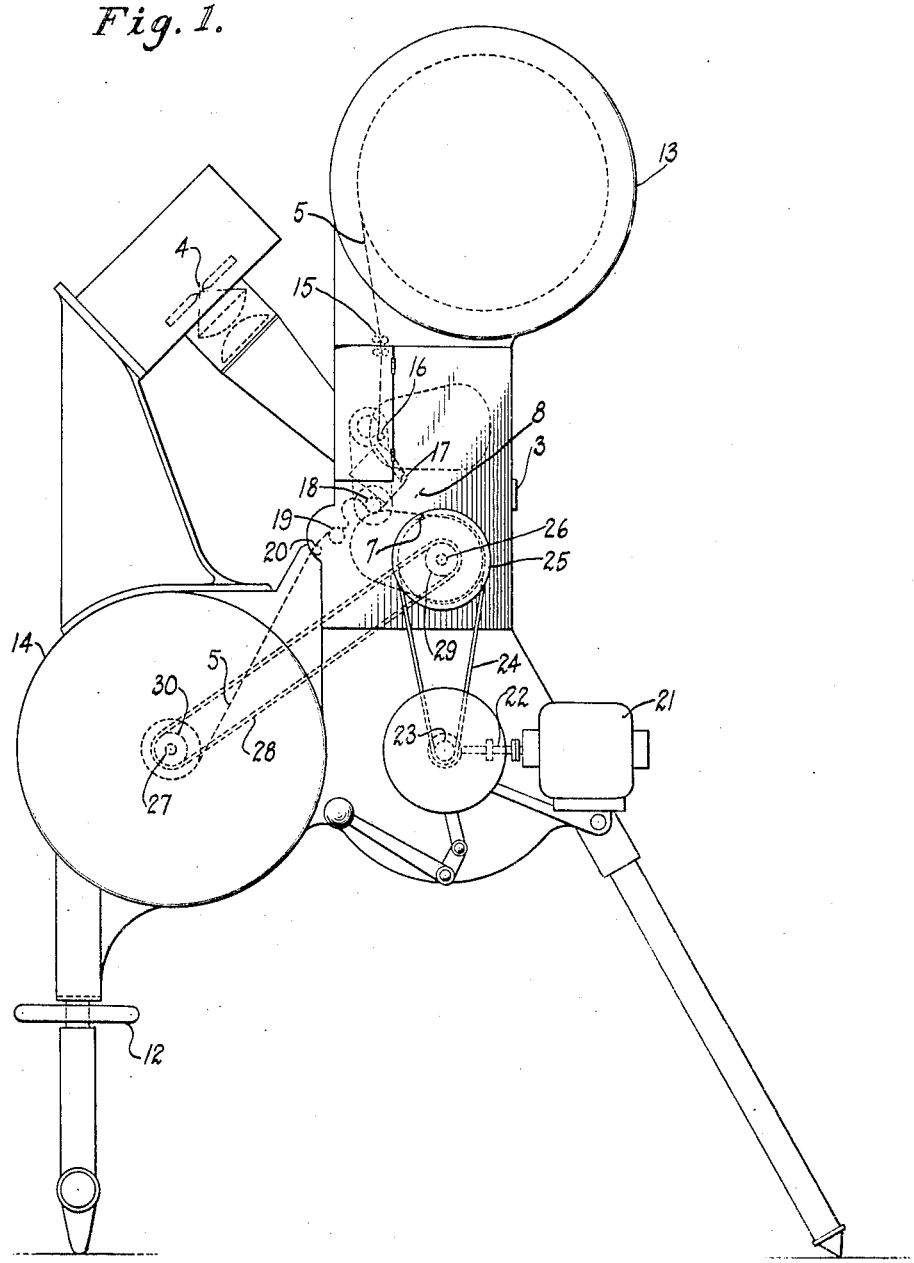
Figure 1 is a side elevation of a machine adapted to carry out the present process.

In Figure 1, the machine is shown as an exhibiting machine, mounted on a tripod or other suitable standard which is adjustable by means of an adjustable hand wheel 12. The film 5 is passed between a feed reel 13 and a take up reel 14 and before the source of light 4, so that a beam of light from this source may be passed through the film on to the primary series of deflectors, thence upon the secondary series and thence through the lens 3. As shown, the film after leaving the feed roll 13 passes between guide and tensioning rolls 15, thence over a directional roll 16, thence over another directional roll 17 to a toothed roll 18, which serves to impart movement to the film. After passing the roll 18, the film moves over rolls 19 and 20 to the take up reel 14. In order to compensate for difference in diameter of the roll film on the take up reel, the film may be looped between the rolls 18 and 19 as shown in Figure 1.

The prime mover for the machine is shown in the form of an electric motor 21, the armature shaft 22 of which has suitable gearing connection with the shaft 23. which, through a belt 24 serves to drive a pulley 25, fixed on a shaft 26. The shaft 26 drives the shaft 27 of the take up reel through a belt or sprocket chain 28 which cooperates with suitable pulleys or sprockets 29 and 30 on the respective shafts.

Figure 2:
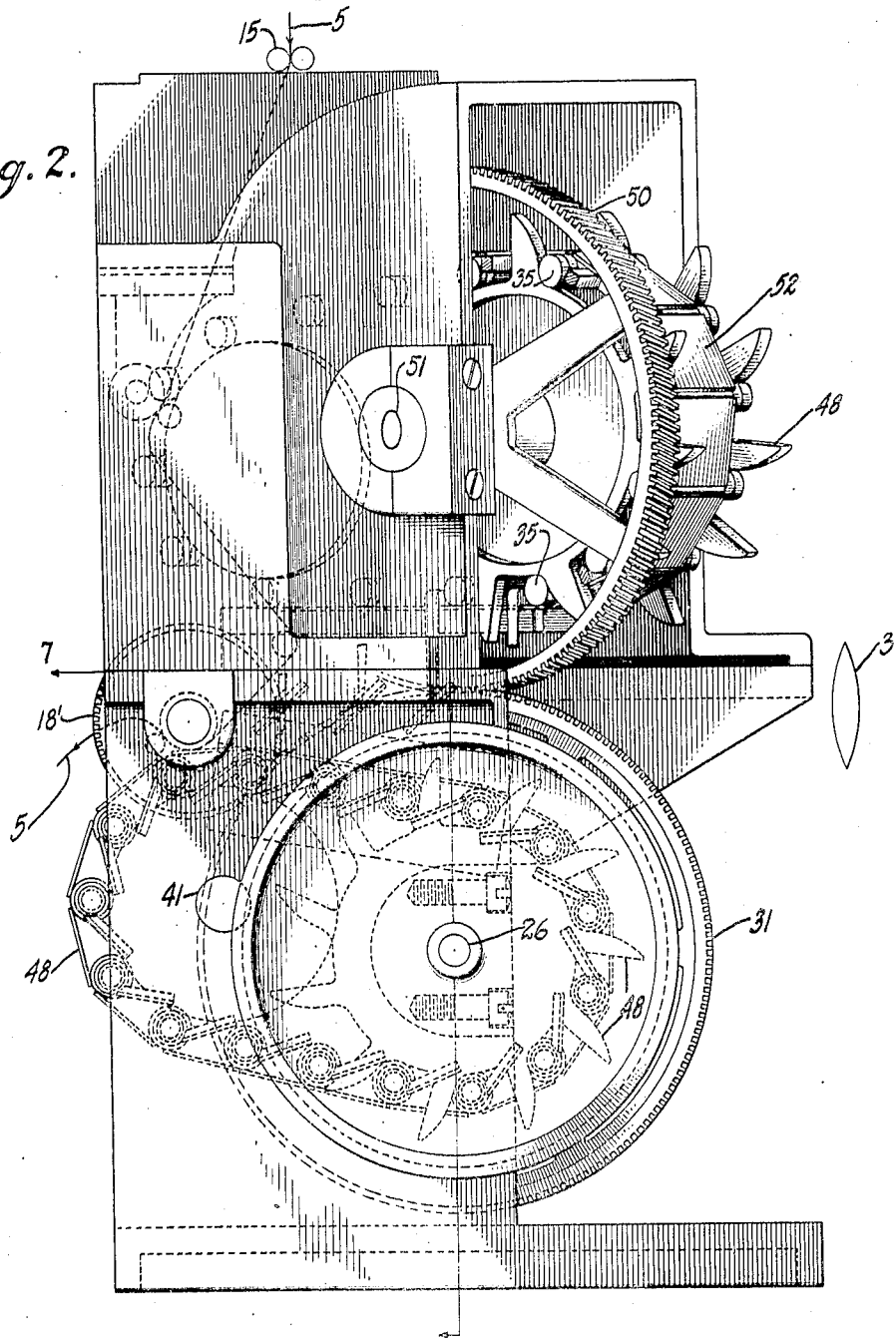
Figure 2 is an enlarged side elevation of a portion of the machine shown in Figure 1 and more especially that portion of the machine which embodies the mounting of the deflectors and the operation thereof.
Figure 7:
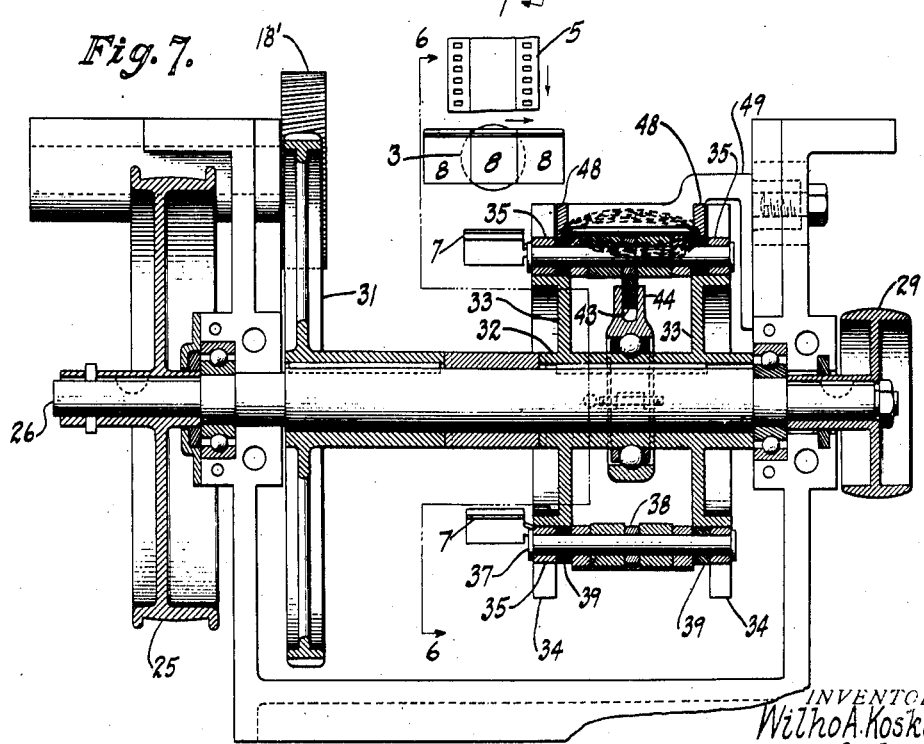
Figure 7 is a section on the line 7—7 of Figure 6.

Figure 7 shows the mounting for the shaft 26 and the pulleys 25 and 29 fixed on said shaft. The drive roll 18 shown in Figure 1 is driven by a carrier 18', which as shown in Figures 2 and 7 is in mesh with the gear 31 geared to the shaft 26. By this construction, the film will be caused to travel at a predetermined speed which is preferably constant.

Figure 5:
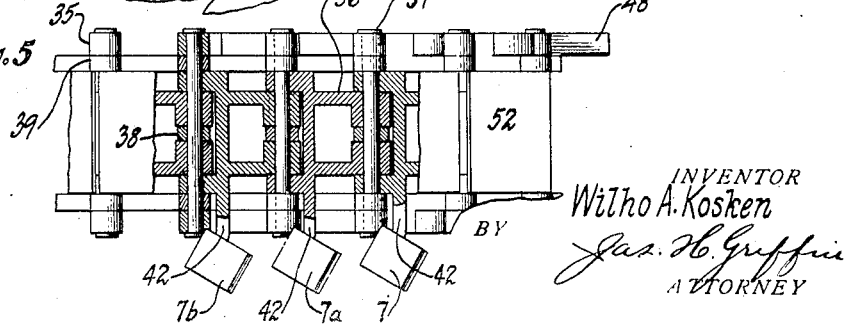
Figure 5 is a plan view of the construction shown in Figure 4 with certain parts shown in section.
Figure 6:
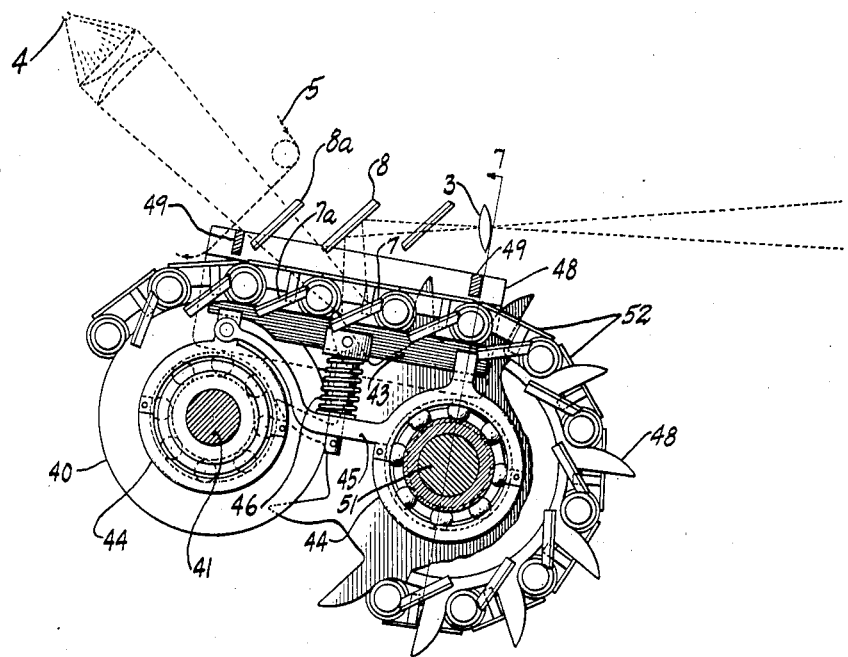
Figure 6 is a section taken on the line 6—6 of Figure 7 and illustrates the mounting for the lower series of deflectors.

Fixed on the shaft 26, as best shown in Figures 6 and 7, is a double gear or sprocket which resembles a two flange pulley with the flanges toothed. The hub of this double gear is designated 32 and has two spaced radially extending flanges 33, the outer radial portions of which are provided with teeth 34 suitably spaced and shaped for cooperation with rollers 35 forming part of an endless flexible carrier on which the primary deflectors are mounted. The general construction of this carrier is shown in Figures 4 to 7. It embodies a succession of links 36 secured together in interfitting relation by means of pins 37 which pass through the respective ends of adjacent links. The small ends of the links are bifurcated and a roller 38 is mounted on each pin 37 within the bifurcation thus provided.

Additional idler rollers 39 are also positioned on each pin 37 directly adjacent the inner faces of the rolls 35. The carrier passes around the double sprocket 32 and also about a double pulley 40 having a pair of spaced flanges corresponding to the flanges 33 and about the periphery of which the rollers 39 are adapted to travel. This guide pulley 40 is mounted on a shaft 41 which is parallel to the shaft 26, and, accordingly, the carrier is adapted for endless movement about the double pulley and double sprocket as will be apparent. Inasmuch as the double sprocket is fixed with respect to the shaft 26, this entire construction will be driven from said shaft.

The primary deflectors 7, $7^a$, $7^b$, etc., are carried by the links of the carrier and are preferably supported on arms 42, formed integral with the links and extending in a lateral direction, the deflectors being fixed to these arms after the manner shown in Figure 5. The carrier is so mounted that as it travels, it will carry the deflectors of the primary series through the zones of approach and recedence in a substantially straight line lying in the plane 1 of Figure 12 and in order that these deflectors will not sag or get out of alinement, the upper reach of the carrier is preferably supported by means of a pressure member 43, best shown in Figures 6 and 7. The opposite ends of this member are supported in upstanding bifurcated portions forming part of collars 44, mounted coaxially of the shafts 26 and 41 and having antifriction connection therewith, so that these collars may remain stationary, while the shaft, gear and pulley rotate. In order to maintain their stationary relation with respect to one another in the pressure member, they are preferably joined by means of a tie 45 (Figure 6) which serves to hold the bifurcated parts in upstanding position, so that the opposite ends of the pressure member may at all times be maintained in the bifurcated portions, as shown in Figures 6 and 7.

About midway of the length of the pressure member 43, it is impelled in an upward direction by means of a spring 46, which causes the rollers 39 to be held against parallel tracks 48 mounted in fixed position on brackets 49 rigid with the frame of the machine. These tracks 48 are of sufficient length to properly guide successive portions of the carrier as it passes through the zones of approach and recedence, to the end that the operations of the deflectors may be steady and along a predetermined path coincident with the plane 1.

To steady the operation of the parts and assist the spring 46 in the performance of its functions, the tracks 48 may be in the form of magnets, either permanent or electromagnets and plates 52 may be associated with the carrier to be maintained in engagement with the tracks through magnetism. This magnetic arrangement may, however, be omitted, or may be used to the exclusion of the spring 46 and pressure member 43.

Figure 3:
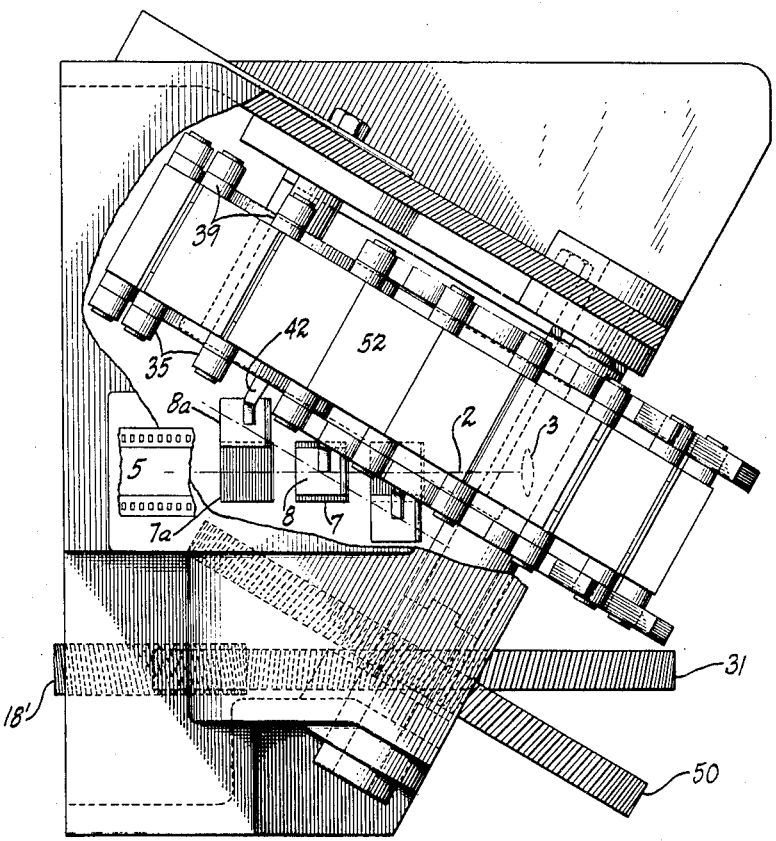
Figure 3 is a plan view of the construction shown in Figure 2 with a portion of the casing broken away in the interest of clearness.
Figure 4:
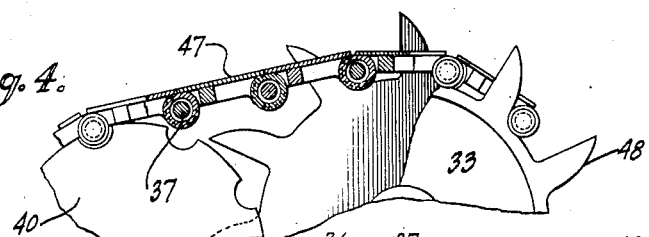
Figure 4 is a fragmental elevation showing mounting and operating mechanism for the upper series of deflectors, certain parts being shown in section.

The mounting for the secondary series of deflectors is substantially identical with that of the primary deflectors except that the parts are inverted inasmuch as the secondary deflectors receive the beam from below and reflect it through the lens 3. The primary and secondary deflectors are operated in synchronism by causing the secondary series to be driven by a gear 50 fixed on the main shaft 51 of the drive sprocket of the secondary deflectors and meshing with the gear 31 which is fixed on the shaft 26. This gearing connection is shown in Figs. 2 and 3.

It will be noted however that the axis of the shaft 51 extends obliquely or in angular relation to the axis of the shaft 26 in order that the deflectors of the secondary series may be caused to pass through their zones of approach and recedence in the plane 11 of Figure 12, as has been hereinbefore explained.

The foregoing detailed description and the accompanying drawings set forth the invention in its preferred practical form. Nevertheless experience has shown that the machine will operate satisfactorily if the film and light are reversed with respect to the lens or objective. In other words, the film may be placed at the opposite end of the machine than which it is shown and the source of light may be placed back of the film at the opposite end of the machine from which it is shown while the lens may be positioned in the position in which the film is illustrated. As a result of this change the upper series of deflectors will become the primary series while the lower series of deflectors will become the secondary series through the transposition of the film and lens or lenses as described.

The drawings show numerous details of construction which will be thoroughly understood by those skilled in the art and it is not thought necessary to describe these details.

Having thus fully described the invention, what I claim as new and desire to secure by Letters Patent is:

1. In a motion picture machine, a lens, a film mounted to travel along a path wherein a plane including the axis of the lens will pass through substantially the longitudinal medial line of the film, a series of primary deflectors mounted to travel along an axis of movement substantially included in said plane, means for projecting a beam of light through the film onto the primary deflectors in succession, and a secondary series of deflectors mounted to travel in a path oblique to and intersecting said plane, which secondary deflectors are positioned to receive the beam deflected from the primary deflectors and direct it through the lens.

2. In a motion picture machine, a lens, a standard film mounted to travel along a path wherein a plane including the axis of the lens will pass through substantially the longitudinal medial line of the film, a series of primary deflectors mounted to travel along an axis of movement substantially included in said plane, means for projecting a beam of light through the film onto the primary deflectors in succession, and a secondary series of deflectors mounted to travel in a path oblique to and intersecting said plane which secondary deflectors are positioned to receive the beam deflected from the primary deflectors and direct it through the lens.

3. In a motion picture machine, a lens, a film mounted to travel continuously along a path wherein a plane including the axis of the lens will pass through substantially the longitudinal medial line of the film, a series of primary deflectors mounted to travel along an axis of movement substantially included in said plane, means for projecting a beam of light through the film onto the primary deflectors in succession, and a secondary series of deflectors mounted to travel in a path oblique to and intersecting said plane, which secondary deflectors are positioned to receive the beam deflected from the primary deflectors and direct it through the lens.

4. In a motion picture machine, a lens, a standard film mounted to travel continuously along a path wherein a plane including the axis of the lens will pass through substantially the longitudinal medial line of the film, a series of primary deflectors mounted to travel along an axis of movement substantially included in said plane, means for projecting a beam of light through the film onto the primary deflectors in succession, and a secondary series of deflectors mounted to travel in a path oblique to and intersecting said plane, which secondary deflectors are positioned to receive the beam deflected from the primary deflectors and direct it through the lens.

5. In a motion picture machine, a film mounted to travel, a lens mounted with its axis situated in a plane passing through the longitudinal medial line of the film, means for projecting light along an axis included in said plane and passing through the film, a primary series of deflectors mounted to move into and out of the path of projected light and to pass through the zones of approach and recedence relative to the projected light along an axis included in said plane, and a secondary series of deflectors mounted to travel along a path intersecting the plane and positioned to successively receive the light deflected from the primary deflectors and direct it through the lens.

6. In a motion picture machine, a film mounted to travel continuously, a lens mounted with its axis situated in a plane passing through the longitudinal medial line of the film, means for projecting light along an axis included in said plane and passing through the film, a primary series of deflectors mounted to move into and out of the path of projected light and to pass through the zones of approach and recedence relative to the projected light along an axis included in said plane, and a secondary series of deflectors mounted to travel along a path intersecting the plane and positioned to successively receive the light deflected from the primary deflectors, and direct it through the lens.

7. In a motion picture machine, a lens, a film mounted to travel, means for projecting a beam of light through the film, a primary series of deflectors mounted to travel along a path intersecting the beam after it has passed through the film and the axis of at least a part of which path is included in a plane including the axis of the lens, a secondary series of deflectors mounted to travel along a path the axis of at least a part of which passes obliquely through said plane and which secondary deflectors are positioned to receive the deflected beam from the deflectors of the primary series and direct such beam to the lens.

8. In a motion picture machine, a lens, a primary series of deflectors mounted to travel along a path, the axis of at least a part of which is included in a plane passed through and including the axis of the lens, a secondary series of deflectors mounted to travel along a path the axis of at least a part of which passes obliquely through said plane, a film mounted to travel continuously, and means for projecting a beam of light through the film on to the deflectors of the primary series as they successively pass through said plane, the deflectors of the primary series being positioned to deflect said beam on to the deflectors of the secondary series, as the latter deflectors successively approach and recede from said plane, and the deflectors of the secondary series being positioned to thereupon deflect said beam to the lens.

9. In a motion picture machine, means for continuously moving a standard motion picture film, a lens, and means for passing a beam of light between the film and the lens, which means embodies two series of cooperating light deflecting elements, means for moving the deflectors of one series along a path, the axis of at least a portion of which is included in a plane which also includes the axis of the lens, and means for moving the deflectors of the other series along a path the axis of at least a portion of which passes obliquely through said plane for the purpose of bringing the deflectors of the series successively into cooperative relation to one another and with the light beam during said portions of their travel, said series of deflectors being relatively positioned to each other and to the lens and film to pass a beam from the film to the lens, or vice versa.

10. In a motion picture machine, means for continuously moving a standard motion picture film, a lens, means for passing a beam of light between the film and lens, said means embodying two series of cooperating light deflecting elements, means for moving the deflectors of one series along a path the axis of at least a portion of which is included in a plane which also includes the axis of the lens, and means for moving the deflectors of the other series along a path the axis of at least a portion of which passes obliquely through said plane for the purpose of bringing the deflectors of the series successively into cooperative relation to one another and with the light beam during said portion of their travel, said series of deflectors being relatively positioned to each other and to the lens and film to pass a beam of constant focal length from the film to the lens, or vice versa.

11. In a motion picture machine, a lens, a series of deflectors mounted to travel along a path at least a portion of the axis of which is included in a plane including the axis of the lens, a second series of deflectors mounted to travel along a path the axis of at least a portion of which intersects said plane, a film mounted to travel continuously, and means for projecting a beam of light through the film onto the deflectors of one series which are traveling in said plane, said deflectors being positioned to deflect said beam onto the deflectors of the other series which are approaching and receding from said plane and which are positioned to direct the beam through the lens.

12. In a motion picture machine, a lens, a series of deflectors mounted to travel along a path at least a portion of the axis of which is included in a plane including the axis of the lens, a second series of deflectors mounted to travel along a path the axis of at least a portion of which intersects said plane, a film mounted to travel continuously, and means for projecting a beam of light through the film onto the deflectors of one series which are traveling in said plane, said deflectors being positioned to deflect said beam onto the deflectors of the other series which are approaching and receding from said plane and which direct the beam through the lens, and the deflectors of both series being so disposed with reference to one another and to the projected beam that said beam will have an angle of incidence with the deflectors of one series substantially twice as great as its angle of incidence with the deflectors of the other series.

13. In a motion picture machine, a lens, a film mounted to travel uninterruptedly along a path the axis of which will cause the film to travel with its medial line in a plane including the axis of the lens, means for projecting a beam of light through the film, a series of primary deflectors, each of which is substantially perpendicular to and extends through said plane at all times, means for moving said deflectors at a uniform speed successively across the path of the projected beam to cause deflection of said beam in a predetermined direction, a secondary series of deflectors mounted to travel at a uniform speed, different from the speed of the primary series, along a path which intersects said plane and also intersects the path of the deflected beam, and means for moving the deflectors of the secondary series successively into and out of the path of the deflected beam, said deflectors of the secondary series being positioned to further deflect the beam and pass it through the lens.

14. In a motion picture machine, a lens, a film mounted to travel along a path the axis of which will cause the film to travel with its medial line in a plane including the axis of the lens, means for projecting a beam of light through the film, a series of primary deflectors, each of which is substantially perpendicular to and extends through said plane at all times, means for moving said deflectors successively across the path of the projected beam to cause deflection of said beam, a secondary series of deflectors positioned at all times perpendicular to said plane and mounted to travel along a path which intersects said plane and also intersects the path of the deflected beam, and means for moving the deflectors of the secondary series successively into and out of the path of the deflected beam for the purpose of further deflecting the beam and passing it through the lens.

15. A deflector mounted for motion picture machines embodying an endless carrier, a plurality of deflectors mounted on said carrier, means for effecting movement of the carrier, and relatively stationary magnetic guiding means for guiding a portion of the length of the carrier.

16. A deflector mounting for motion picture machines embodying an endless carrier comprising units pivotably associated with one another, deflectors carried by said units, spaced apart rotatable elements embraced by the carrier, and a magnetic guide to support the carrier between said elements.

17. A deflector mounting for motion picture machines embodying an endless carrier comprising links pivoted to one another, a deflector mounted on each link, a pair of radial elements spaced apart and embraced by the carrier, and magnetic guide tracks between the radial elements for guiding the carrier.

18. The method of projecting motion pictures which consists in causing a film to travel continuously, projecting a beam of light through and beyond said film, causing a plurality of deflectors to travel along a path intersecting the projected beam of light and the axis of which path is coincident with a plane passing through the axis of the objective lens and the medial line of the film, and utilizing said deflectors to deflect the beam on to a plurality of additional deflectors moving in a path intersecting said plane and positioned to further deflect the beam and direct it through the lens.

19. The method of projecting motion pictures which consists in projecting a beam of light through a standard motion picture film while the film is caused to move constantly and directing the projected beam beyond the film upon a series of deflectors which travel along a path the medial line of which is coincident with a plane passing through a lens through which the beam is to be passed, and directing the deflected beam through the lens by means of a second series of deflectors which are positioned to receive the deflected beam and travel in a direction oblique to the plane which includes the medial line of the film, the source of light, the axis of the first series of deflectors and the axis of the lens.

20. The method of producing motion pictures which consists in projecting a beam of light through a motion picture film, causing the film to move continuously, directing the transmitted beam upon one or more of a series of deflectors, moving said deflectors consecutively across the path of the beam in a direction parallel to a plane including substantially the medial line of the film and the axis of a lens through which the beam is to be projected, employing said deflectors to deflect said transmitted beam onto one or more deflectors of a second series positioned to receive said beam, and causing said deflectors of the second series to move consecutively across said deflected beam in a path intersecting said plane, whereby continuous images of the film may be produced upon the screen.

21. The method of producing motion pictures which consists in projecting a beam of light through a standard motion picture film, causing the film to move at a constant speed, directing the transmitted beam upon one or more of a series of deflectors, moving said deflectors consecutively across the path of the beam in a direction parallel to a plane including substantially the medial line of the film and the axis of a lens through which the beam is to be projected, employing said deflectors to deflect said transmitted beam upon one or more deflectors of a second series positioned to receive said beam, and causing said deflectors of the second series to move consecutively across said deflected beam in a path intersecting said plane, whereby continuous images of the film may be produced upon the screen.

22. The method of producing motion pictures which consists in causing a standard motion picture film to travel at a constant speed, projecting a beam of light through said film in a continuous manner and bending the transmitted beam twice before it passes through a lens through the employment of two series of deflectors, causing the deflectors of one series to travel along a path the medial line of which is included in a plane which also includes the medial line of the film and the axis of the objective to bring the deflectors of said series successively into cooperative relation with the transmitted beam, utilizing said series of deflectors to deflect the beam on to the deflectors of the other series which are caused to travel in a path intersecting said plane, and utilizing said second series of deflectors to again deflect the beam with the angle of incidence on one series of deflectors substantially twice the angle of incidence on the cooperating deflectors of the other series.

23. The method of projecting motion pictures which consists in projecting a beam of light through a standard motion picture film while the film is caused to move continuously and directing the projected beam beyond the film upon a series of deflectors which travel along a path the medial line of which is coincident with a plane passing through a lens through which the beam is to be passed, and directing the deflected beam through the lens by means of a second series of deflectors which travel in a direction oblique to the plane which includes the medial line of the film, the source of light, the axis of the first series of deflectors and the lens.

24. The method of producing motion pictures which consists in projecting a beam of light through a standard motion picture film, causing the film to move continuously, directing the transmitted beam upon one or more of a series of deflectors, moving said deflectors consecutively across the path of the beam in a direction parallel to a plane including substantially the medial line of the film and the axis of a lens through which the beam is to be projected, employing said deflectors to deflect said transmitted beam upon one or more deflectors of a second series, positioned to receive said beam, and causing said deflectors of the second series to move consecutively across said deflected beam in a path intersecting said plane, whereby continuous images of the film may be produced upon the screen.

25. The method of producing motion pictures which consists in causing a standard motion picture film to travel continuously, projecting a beam of light through said film in a continuous manner and bending the transmitted beam twice before it passes through a lens through the employment of two series of deflectors, causing the deflectors of one series to travel along a path the medial line of which is included in a plane which also includes the medial line of the film and the axis of the objective to bring the deflectors of said series successively into cooperative relation with the transmitted beam, utilizing said series of deflectors to deflect the beam on to the deflectors of the other series which are caused to travel in a path intersecting said plane, and utilizing said second series of deflectors to again deflect the beam with the angle of incidence on one series of deflectors substantially twice the angle of incidence on the cooperating deflectors of the other series.

In testimony whereof I have signed the foregoing specification.

WILHO A. KOSKEN.